(No Model.)　　　　　　　　　　　　　　　　5 Sheets—Sheet 1.

J. J. KELLY.
BAG PRINTING MACHINE.

No. 455,404.　　　　　　　　　　Patented July 7, 1891.

WITNESSES:　　　　　　　　　　　　　　　INVENTOR:

John E. Morris　　　　　　　　　　　　　　J. J. Kelly
Otto H. Ehlers

BY Chas. B. Mann
　　　　　　　　ATTORNEY.

(No Model.) 5 Sheets—Sheet 3.

J. J. KELLY.
BAG PRINTING MACHINE.

No. 455,404. Patented July 7, 1891.

WITNESSES:
John E. Morris
Otto H. Ehlers.

INVENTOR:
J. J. Kelly
BY Chas. B. Mann
ATTORNEY.

(No Model.) 5 Sheets—Sheet 4.

J. J. KELLY.
BAG PRINTING MACHINE.

No. 455,404. Patented July 7, 1891.

WITNESSES:
Otto H. Ehlers.
John E. Morris.

INVENTOR:
J. J. Kelly

BY Chas B. Mann
ATTORNEY.

(No Model.) 5 Sheets—Sheet 5.
J. J. KELLY.
BAG PRINTING MACHINE.
No. 455,404. Patented July 7, 1891.
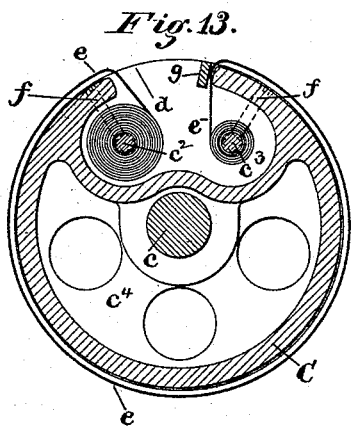
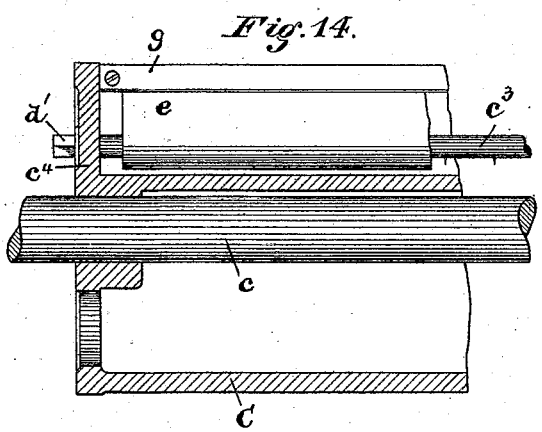
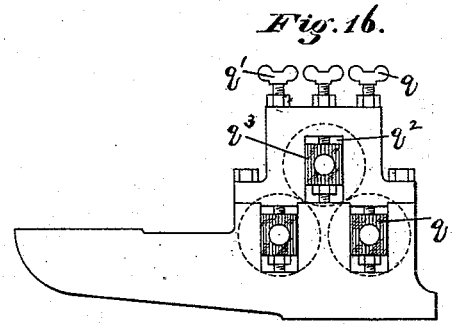
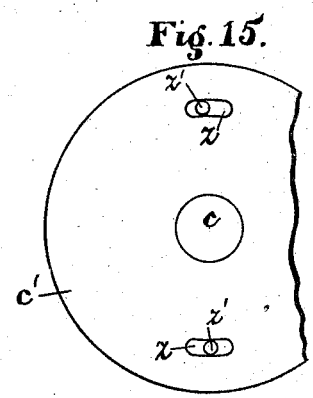
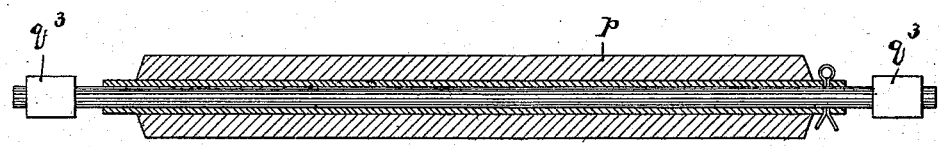
WITNESSES:
John E. Morris
Otto H. Ehlers
INVENTOR:
J. J. Kelly
BY Chas B. Mann
ATTORNEY.

UNITED STATES PATENT OFFICE.

JAMES J. KELLY, OF BALTIMORE, MARYLAND.

BAG-PRINTING MACHINE.

SPECIFICATION forming part of Letters Patent No. 455,404, dated July 7, 1891.

Application filed February 24, 1890. Serial No. 341,411. (No model.)

*To all whom it may concern:*

Be it known that I, JAMES J. KELLY, a citizen of the United States, residing at Baltimore, in the State of Maryland, have invented certain new and useful Improvements in Bag-Printing Machines, of which the following is a specification.

This invention relates to a machine for printing paper bags, the object being to provide a machine to apply two impressions or two colors on one side of the bag and one impression on the opposite side.

The invention is devised to accomplish this end, and is herein first fully described, and then particularly pointed out in the claims.

Figure 1:
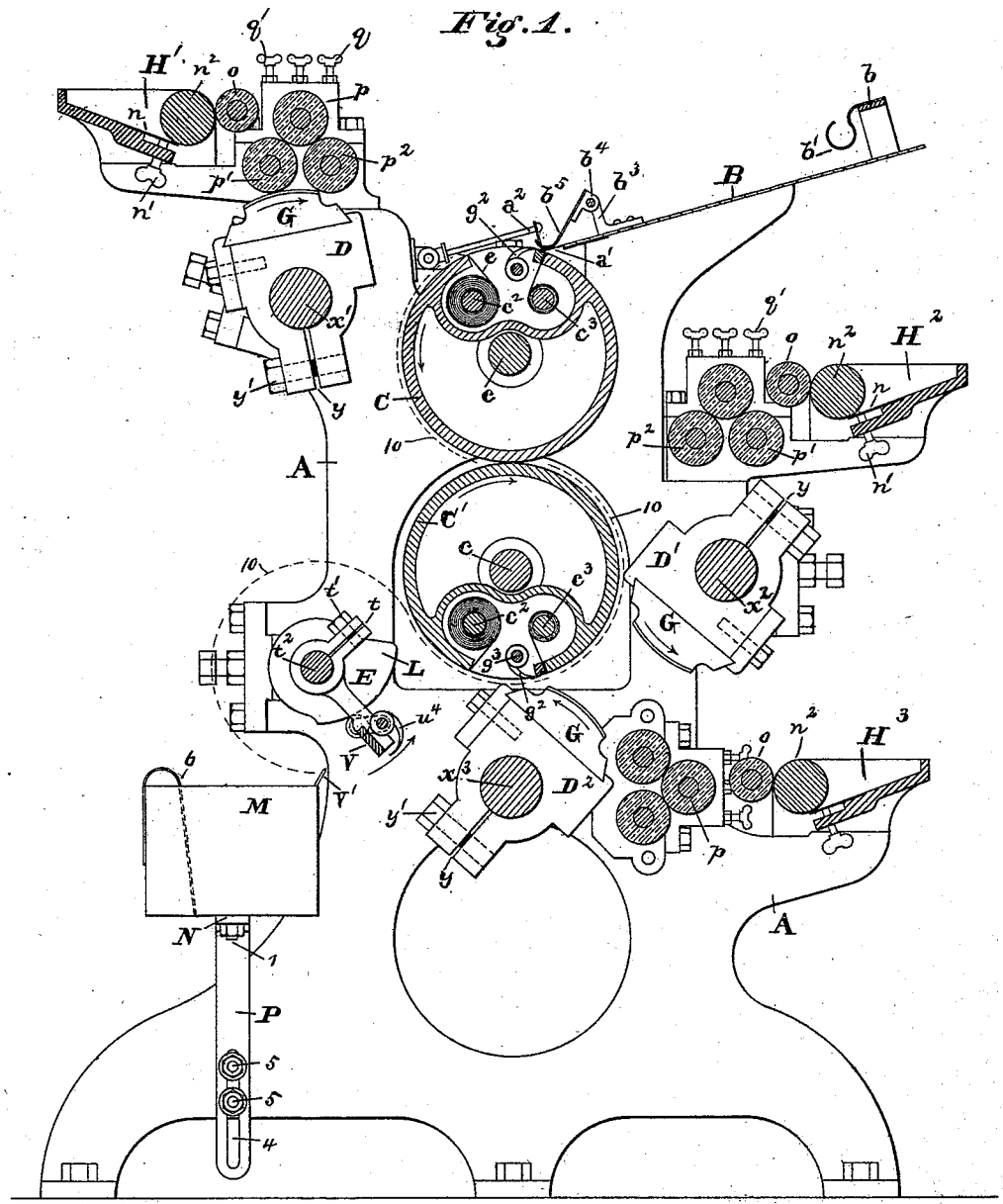
Figure 2:
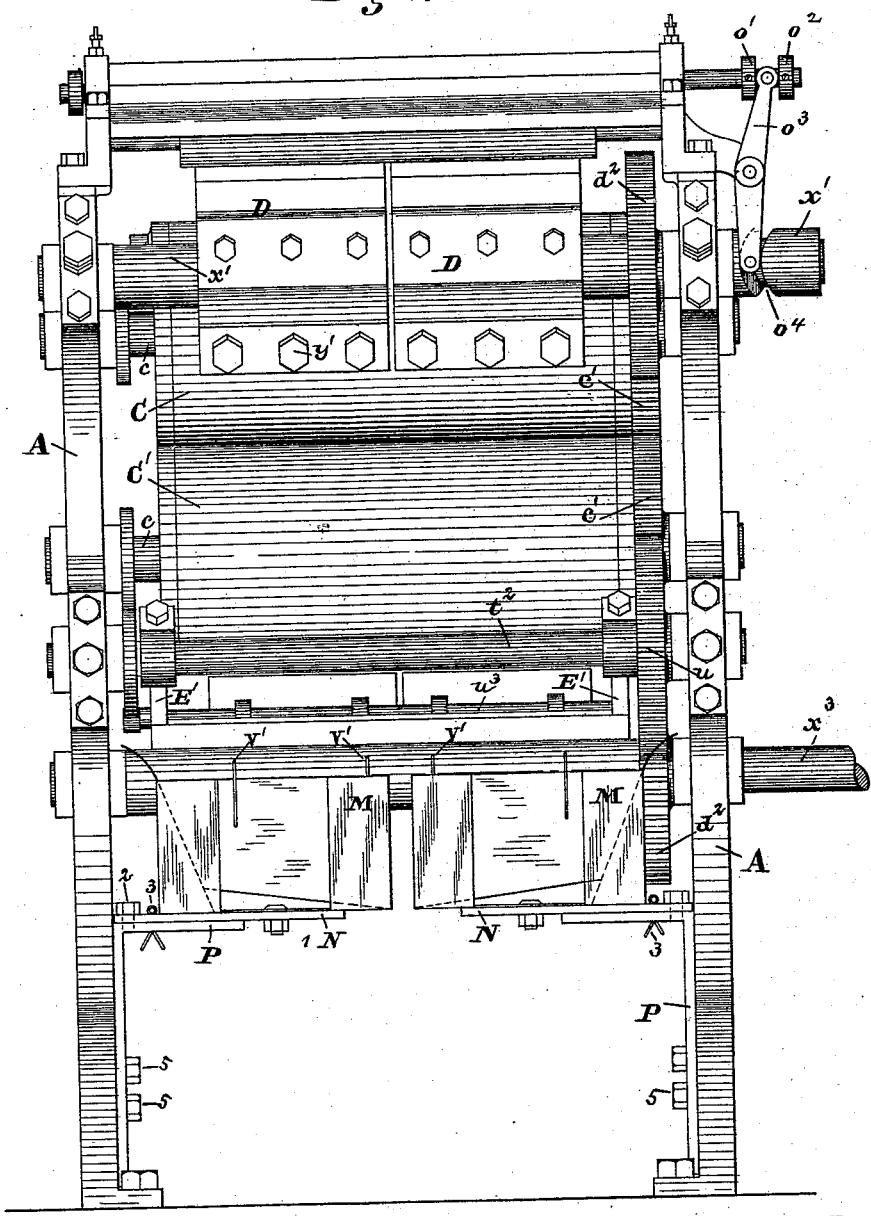
Figure 3:
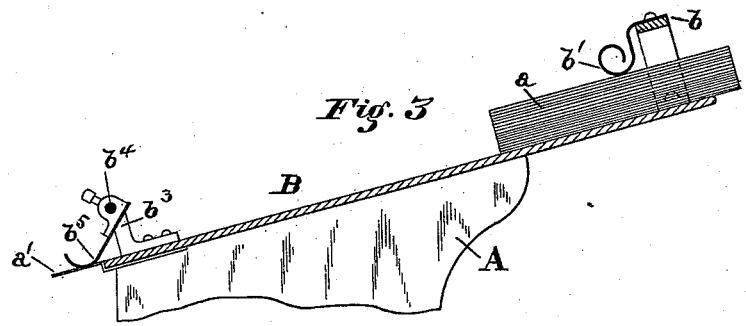
Figure 4:
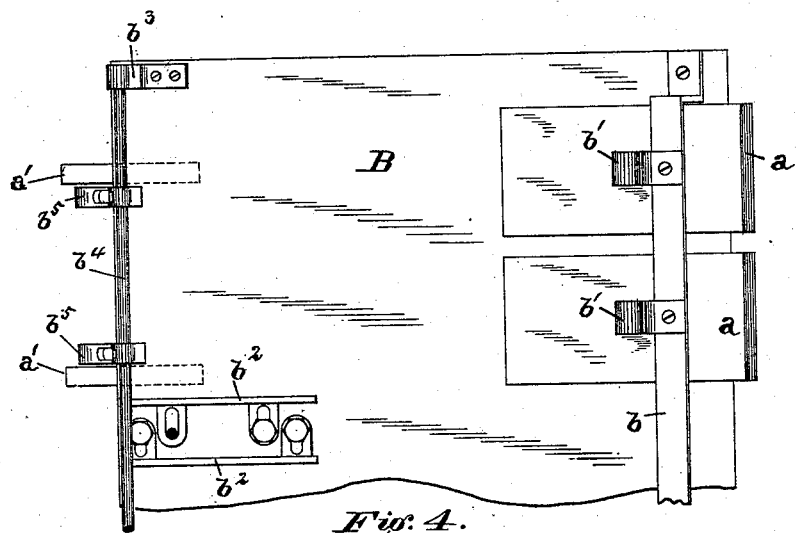
Figure 5:
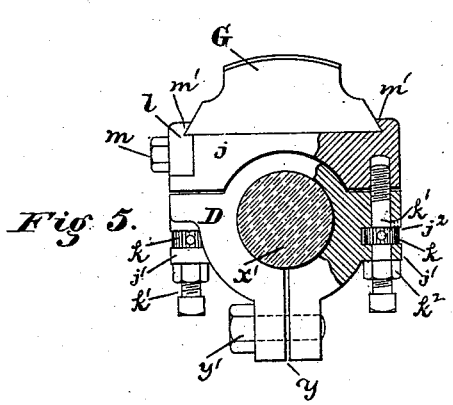
Figure 6:
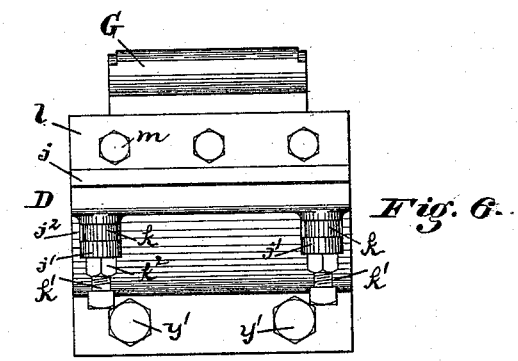
Figure 7:
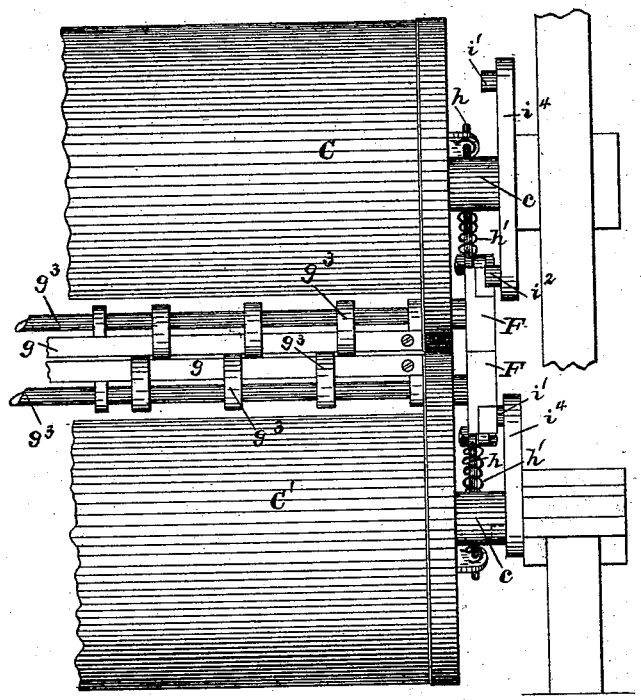
Figure 8:
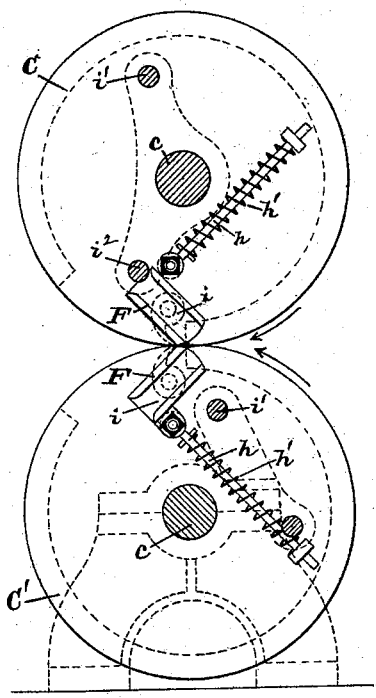
Figure 9:
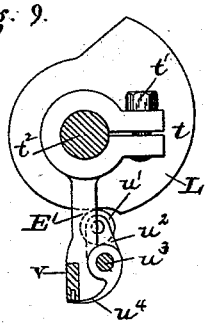
Figure 10:
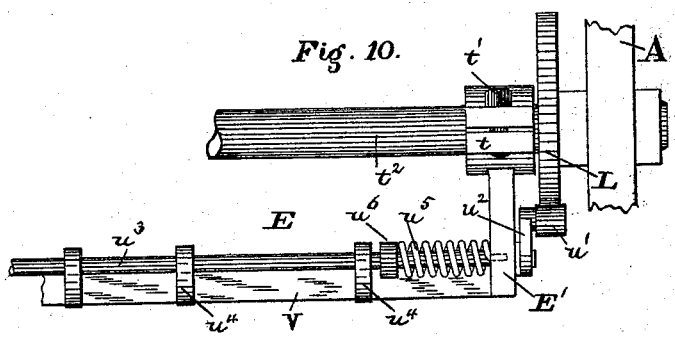
Figure 11:
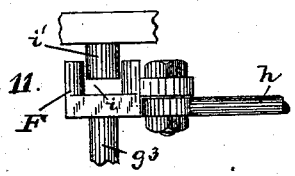
Figure 12:
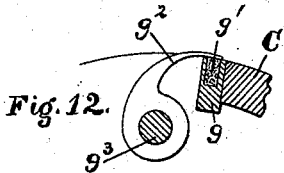

In the drawings herewith, Figure 1 is a vertical longitudinal section through the center of the press. Fig. 2 is an elevation showing a back view of the press. Figs. 3 and 4 are detail views showing the clamping-springs, guides, and fenders on the feed-board. Figs. 5 and 6 are detail views of one of the split-form cylinders. Figs. 7 and 8 are detail views showing mechanism for operating the grippers on the impression-cylinders. Figs. 9 and 10 are detail views showing the delivery mechanism. Fig. 11 shows a tumbler and pin for operating same. Fig. 12 is a view of one of the grippers and a section of the rubber bearing.
Figs. 13 and 14 are sectional views of one of the impression-cylinders and show the smut-blanket and means for operating it. Fig. 15 is a view of the gear-wheel on the impression-cylinder. Fig. 16 is a detail view showing means for raising and lowering the distributing-rollers. Fig. 17 is a longitudinal section of one of the ink-distributing rollers.

The letter A designates the frame of the press; B, the feed-board; C C', the two impression-cylinders; D D' $D^2$, the three form or printing cylinders, respectively, and E the delivery-cylinder or skeleton delivery-frame.

On the upper end of the feed-board B, and extending across it, is a bridge $b$, to which springs $b'$ are attached. A bundle of bags $a$, placed under the bridge, will be pressed by a spring $b'$, which prevents the bags from sliding down the feed-board. At the lower end and center of the feed-board are adjustable guides $b^2$, which provide for two operators, one at each side, working at same time. The supports $b^3$, one of which only is shown, carry an elevated shaft $b^4$, extending across the board and having spring-fenders $b^5$ for holding a bag until taken by the grippers on the impression-cylinder, and said fenders also form a guard for the operator's hand. At the lower edge of the feed-board and adjacent to the fenders $b^5$ are projecting thin narrow plates $a'$, and a stop-arm $a^2$ impinges down upon each of these plates. The operator who feeds the paper bag shoves it down under a fender $b^5$ until the forward edge of the bag comes in contact with that part of the stop-arm $a^2$ which impinges on the said narrow plate $a'$. In this position the forward edge of the bag will be projecting beyond the lower edge of the feed-board, and the gripper $g^2$ on the impression-cylinder can readily take hold of it.

The impression-cylinders C C' are mounted on shafts $c$, each of which carries a gear-wheel $c'$. This gear-wheel is provided with two slots $z$ concentric with the shaft $c$, and a bolt $z'$, passes through each slot into the end of the cylinder and confines the gear-wheel rigidly thereto. The slots $z$ allow the position of the cylinder to be shifted or adjusted, so that when the gear-wheels of the two cylinders are meshed the cylinders C C' may be adjusted to bring the grippers $g^2$ in the exact position desired. The cylinder-shafts have their journals in the frame A. Each of the impression-cylinders C C' is hollow and has a longitudinal opening $d$, and contains two rollers $c^2$ $c^3$, extending lengthwise, which have journals in the cylinder-heads $c^4$. These rollers $c^2$ $c^3$ carry the smut-blanket $e$, which is wound on one roller $c^2$ and passes through the opening $d$, thence around the outside of the impression-cylinder to the said opening, and thence to the other roller $c^3$. The shifting of the smut-blanket is done from outside. At one end the rollers have a square end $d'$, which projects beyond the cylinder-heads $c^4$ (see Fig. 14) to receive a wrench or key. Set-screws $f$ (indicated by broken lines in Fig. 13) prevent the rollers $c^2$ $c^3$ from revolving after the blanket has been adjusted. A metal bar $g$ is secured along the edge at one side of the opening $d$, and the smut-blanket passes freely under the bar. The outer side of this bar $g$ has a longitudinal slot $g'$ for receiving rubber or some suitable elastic composition (see Fig. 12) for making a suitable bearing for grippers $g^2$, which are mounted on a shaft $g^3$, parallel with the bar, and have bearings in the cylinder-heads $c^4$. To one end of this shaft is fixed a tumbler F, Figs. 7, 8, and 11, to which is jointed a rod $h$, surrounded by a spiral spring $h'$, as will be readily seen from the drawings. This spring keeps the gripper firmly upon the elastic bearing-surface on the bar $g$. The tumbler F is provided with a slot $i$, which, when the cylinder turns, engages with pins $i'$ $i^2$, fixed on plates $i^4$, attached to the frame A. These fixed pins are so situated that they will engage with the tumbler F at certain intervals, tripping them, and thus raising the grippers $g^2$ off their elastic surface or seats.

The form or printing cylinders D D' $D^2$, Figs. 1, 2, 5, and 6, are split at one side, as at $y$, and have set-screws $y'$ to compress the split. Each cylinder is mounted on a shaft $x'$ $x^2$ $x^3$ with bearings in the frame A. These shafts each carry a gear-wheel $d^2$. This wheel on the upper "form" shaft $x'$ meshes with the gear-wheel $c'$ on the upper impression-cylinder C and the like wheel $d^2$ on the middle form-shaft $x^2$, and also the one on the lower form-shaft $x^3$, both mesh with the gear-wheel $c'$ on the lower impression-cylinder C'.

The form-cylinders D D' $D^2$, of which there are two on each shaft, carry an adjustable holder $j$, which clamps the form-block or printing-block G. These cylinders are provided (see Figs. 5 and 6) on two sides with an ear or boss $j'$, which forms a space or recess $j^2$ for receiving a collar $k$, which is fastened to a screw $k'$ by means of a pin. The screw passes through a hole in the ear or boss, and both the screw and collar may be turned freely without advancing. One of the threaded ends of the screw enters a threaded hole in the adjustable holder $j$, and the other end is provided with jam-nuts $k^2$. Thus it will be seen that the adjustable holder $j$ may be raised or lowered, so as to get a heavier or lighter impression by only turning the screws $k'$ and jam-nuts $k^2$. The adjustable form-holder $j$ has a detachable side bar $l$, secured by bolts or screws $m$. This bar has an undercut edge $m'$, and this, with a similar edge on the opposite side of the holder, forms a dovetail slideway and clamp to receive and hold the printing-block G.

The ink-fountains H' $H^2$ $H^3$ are each provided at the bottom with a blade $n$, operated by a set-screw $n'$ to govern the amount of ink taken upon the distributing-roller $n^2$, from which the ink is taken by a roller $o$. Upon one end of this roller in the upper set is mounted two collars $o'$ $o^2$, between which a friction-roller plays. This roller is mounted on one end of a lever $o^3$, the other end having a similar friction-roller, which travels in a cam-groove $o^4$ on the shaft $x'$ of the form-cylinder. By the revolution of this cam-groove a vibratory endwise motion is imparted to the distributing-roller $o$. This same roller has also a fore-and-aft reciprocating movement to enable it to deposit its ink upon the distributing-roller $p$, which spreads it upon the surfaces of both the ink-applying rollers $p'$ $p^2$, from which it goes to the type-form. The three ink-distributing rollers $p$ $p'$ $p^2$ are so arranged as to allow each one to be vertically adjusted separately by means of set-screws $q$ $q'$ and square journal-boxes $q^3$ in the slideway $q^2$, as shown in Fig. 16.

The first ink-fountain H' supplies ink for printing an impression on one side of a paper. The second fountain $H^2$ supplies ink of one color, and the third fountain $H^3$ ink of a different color, both of which colors are impressed on the same side of the paper, being the side opposite that which received the ink from the first fountain.

The skeleton delivery-frame E is provided with two heads, each having a split $t$ and set-screw $t'$, by which the split can be clamped to the shaft $t^2$. It also has an arm E'. The shaft carries a gear-wheel $u$, intermeshing with the wheel on the lowest form-cylinder shaft $x^3$. This shaft $t^2$ has its journals in the frame A and is supported by the same. A slotted metal bar V connects the arms on the two heads. This bar is similar and for the same purpose as the one $g$ used in the impression-cylinders. The arms also support the gripper-shaft $u^3$. A cam L is attached to the frame A, upon which travels a friction-roller $u'$, attached to an arm $u^2$, fixed to the gripper-shaft $u^3$, carrying the grippers $u^4$. The shaft $u^3$ is provided with a spiral spring $u^5$, one end of which enters the arm E'. The other end enters a collar $u^6$ on the shaft. This spring keeps the grippers down upon the elastic bearing-surface. (See Fig. 9.) It will thus be seen that the cam L will raise the grippers when the friction-roller $u'$ rides up on the highest part of the cam. The arm $u^2$ and its roller $u'$, by traveling on the stationary cam L, will cause the gripper $u^4$ to be raised, (opened,) ready to take a bag from the lower impression-cylinder C'. Just previous to the said roller $u'$ passing off the cam the edge of a printed bag on the lower impression-cylinder will take position under the gripper $u^4$, and the moment the roller passes off the grippers will close down upon and hold the bag. Thus held the printed bag will be carried first over and then down, and when the roller $u'$ again comes in contact with the cam L the gripper will release the bag, and the latter will drop into one of the delivery-boxes M.

The delivery-boxes M, Figs. 1 and 2, have one side at the rear partly open to facilitate removing the bag, and are provided at the opposite side and top edge with upward-projecting prongs V' of wire. The bag held by the revolving delivery-gripper $u^4$ will strike against these prongs V', and thereby the bag will be removed from the gripper and prevented from adhering to it. The boxes therefore must be properly adjusted so as to have the said prongs V' in exactly the right place. To this end the boxes M are provided with means for both a vertical and horizontal adjustment. Each box has at its bottom a bolt 1, which slides in a slotted bar N, thus allowing a horizontal adjustment. This bar N is secured to a right-angled supporting-bar P by means of a screw 2 and split key 3. This right-angled bar has a slot 4 and is adjustable vertically by means of bolts 5, entering the frame, thus allowing the box to have a vertical adjustment, as will be readily seen. The boxes are also provided with fenders 6, so that bags will all take one position in the boxes.

Having described the several parts of my invention, the operation of the press will now be described.

The operator places a bundle of bags under the spring $b'$ on the feed-board, from which they are separately fed upon the first impression-cylinder C and receive one impression on one or the back side. By means of the form-cylinders D the bag then passes to the second impression-cylinder C, where its front side is exposed, and while thereon receives two impressions or two colors by means of the two form-cylinders $D'$ and $D^2$. It will thus be seen that the opposite sides of the bag have been printed. The bag is then taken by the grippers of the delivery-cylinder E and deposited in the delivery-boxes M, the whole operation being free of liability to smut the print, the path of the bag being indicated by the dotted lines 10, Fig. 1.

Different parts of the machine will admit of variations from the construction here shown. All equivalents and mere modifications are therefore included as within the scope of my invention.

This machine has been described as useful for printing both sides of paper bags. It is obvious, however, that it will print both sides of any kind of work, and it may therefore be used for printing other work beside bags.

Having described my invention, I claim—

1. In a printing-press, the combination, with the feed-board having guides and adapted to feed simultaneously a plurality of papers to be printed, of a fixed bridge or bar arranged above the rear end of the board and extending across the same, and a series of spring-fingers adjustably attached to said bridge-bar and each arranged to bear upon a separate pile of paper on the board, substantially as described.

2. The combination, in a printing-press, with the feed-board, impression-cylinder, and two form-cylinders on a single shaft, of adjustable guides arranged at the center of said feed-board, substantially as described.

3. In a printing-press, the combination, with the feed-board adapted to simultaneously feed a plurality of sheets side by side, having thin narrow plates attached to the feed-board and projecting beyond the lower edges thereof, of an elevated shaft extending across the board at its lower edge and rigidly secured thereto, and a series of spring-fenders attached to said shaft, one for each series of sheets, each fender being adjacent to one of the spring-plates, substantially as described.

4. In a printing-press, the combination of a cylinder, a metal bar secured on the cylinder lengthwise and having a longitudinal slot $g'$, filled with suitable elastic composition, and a rock-shaft also on said cylinder and parallel with said slotted bar and provided with grippers $g^2$, which seat or bear on said elastic composition.

5. In a printing-machine, the combination, with a feed-board having central guides for feeding two sets of sheets to the press, two impression-cylinders close together, each provided with gripping devices for holding the sheets on the cylinders, a shaft carrying two form-cylinders coacting with one of said impression-cylinders, two shafts, each carrying two form-cylinders, each of which coact with the other impression-cylinder, a delivery-cylinder provided with grippers to take the sheet from the last impression-cylinder, and a delivery-box having upward-projecting bearings to remove the sheet from the delivery-cylinder, the said delivery-box being adjustable both vertically and horizontally, substantially as described, whereby two sets of sheets can be simultaneously fed to the press and be printed on one side, and then receive two impressions on the other side of the sheet, and finally be delivered into the delivery-box, substantially as described.

In testimony whereof I affix my signature in presence of two witnesses.

JAMES J. KELLY.

Witnesses:
JOHN E. MORRIS,
JNO. T. MADDOX.